No. 646,604. Patented Apr. 3, 1900.
B. V. NORDBERG.
BOTTLE WASHER.
(Application filed May 15, 1893.)
(No Model.) 8 Sheets—Sheet 1.

Witnesses:
Geo. W. Young.
Chas. L. Goss.

Inventor:
Bruno V. Nordberg,
By Winkler Flanders Smith Bottum & Vilas
Attorneys.

No. 646,604. Patented Apr. 3, 1900.
B. V. NORDBERG.
BOTTLE WASHER.
(Application filed May 15, 1893.)
(No Model.) 8 Sheets—Sheet 2.

No. 646,604. Patented Apr. 3, 1900.
B. V. NORDBERG.
BOTTLE WASHER.
(Application filed May 15, 1893.)

(No Model.) 8 Sheets—Sheet 3.

Witnesses
Geo W Young
Chas L Goss

Inventor
Bruno V Nordberg
By Winkler Flanders Smith Bottum Vilas
Attorneys

No. 646,604. Patented Apr. 3, 1900.
B. V. NORDBERG.
BOTTLE WASHER.
(Application filed May 15, 1893.)
(No Model.) 8 Sheets—Sheet 4.
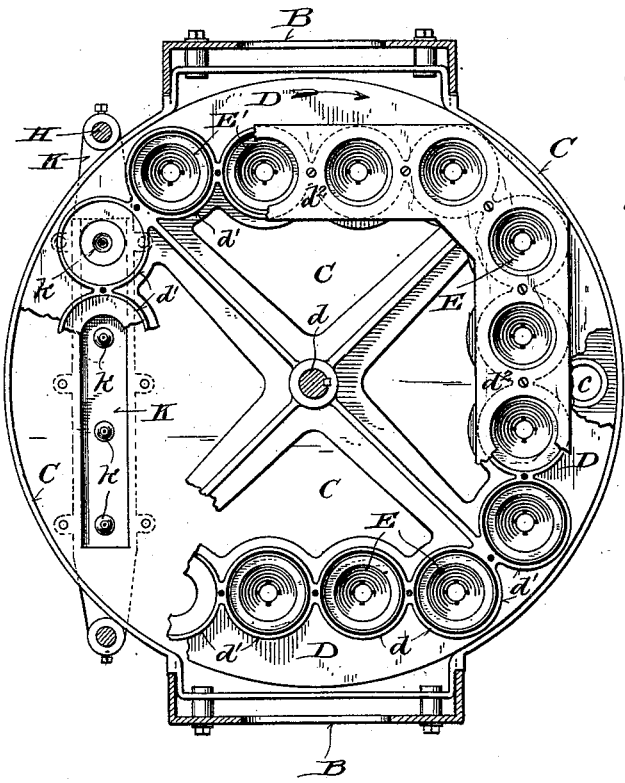
Fig. 4.
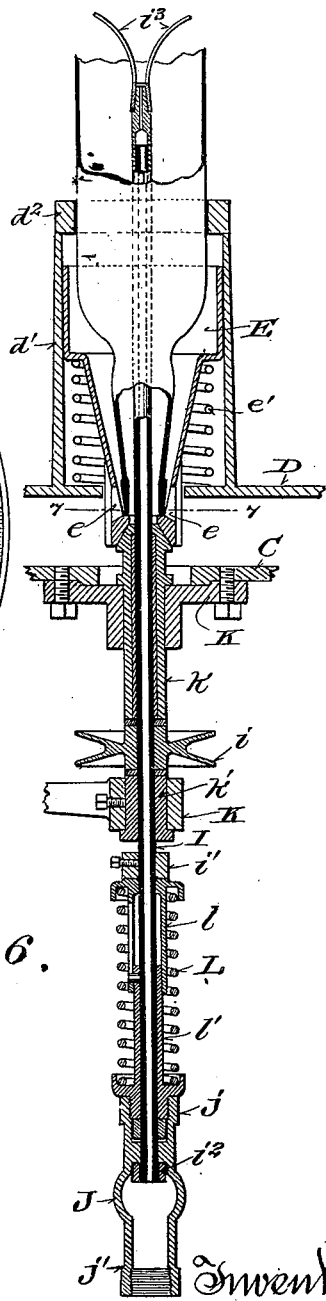
Fig. 6.
Fig. 7.

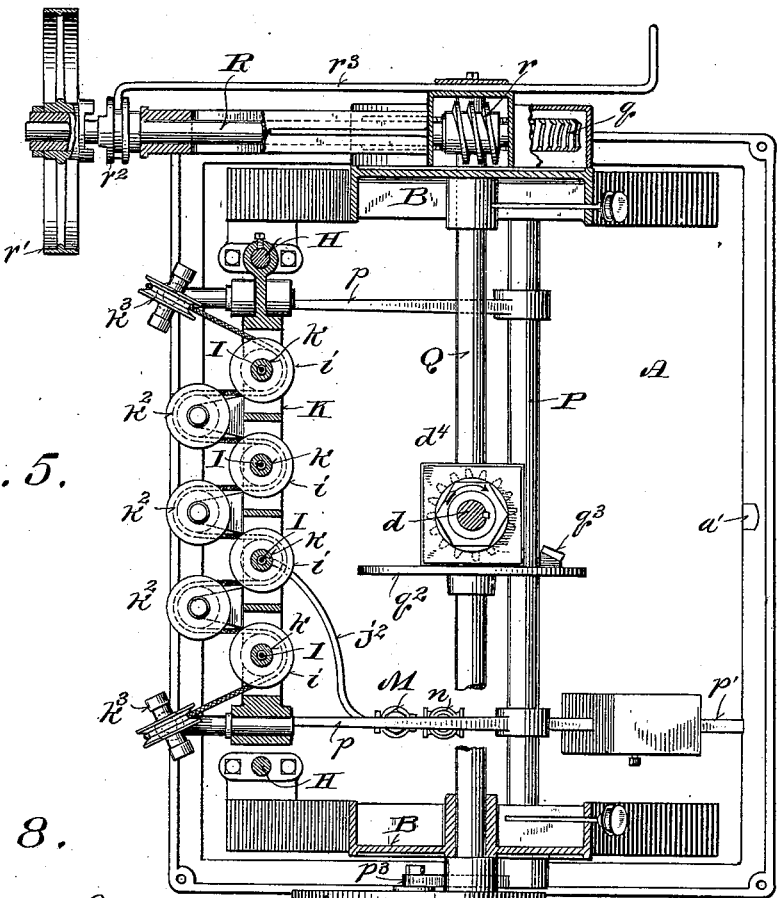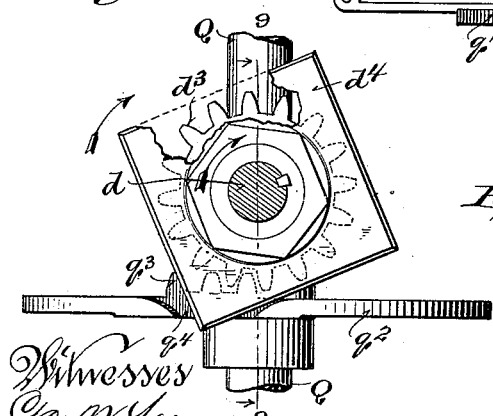

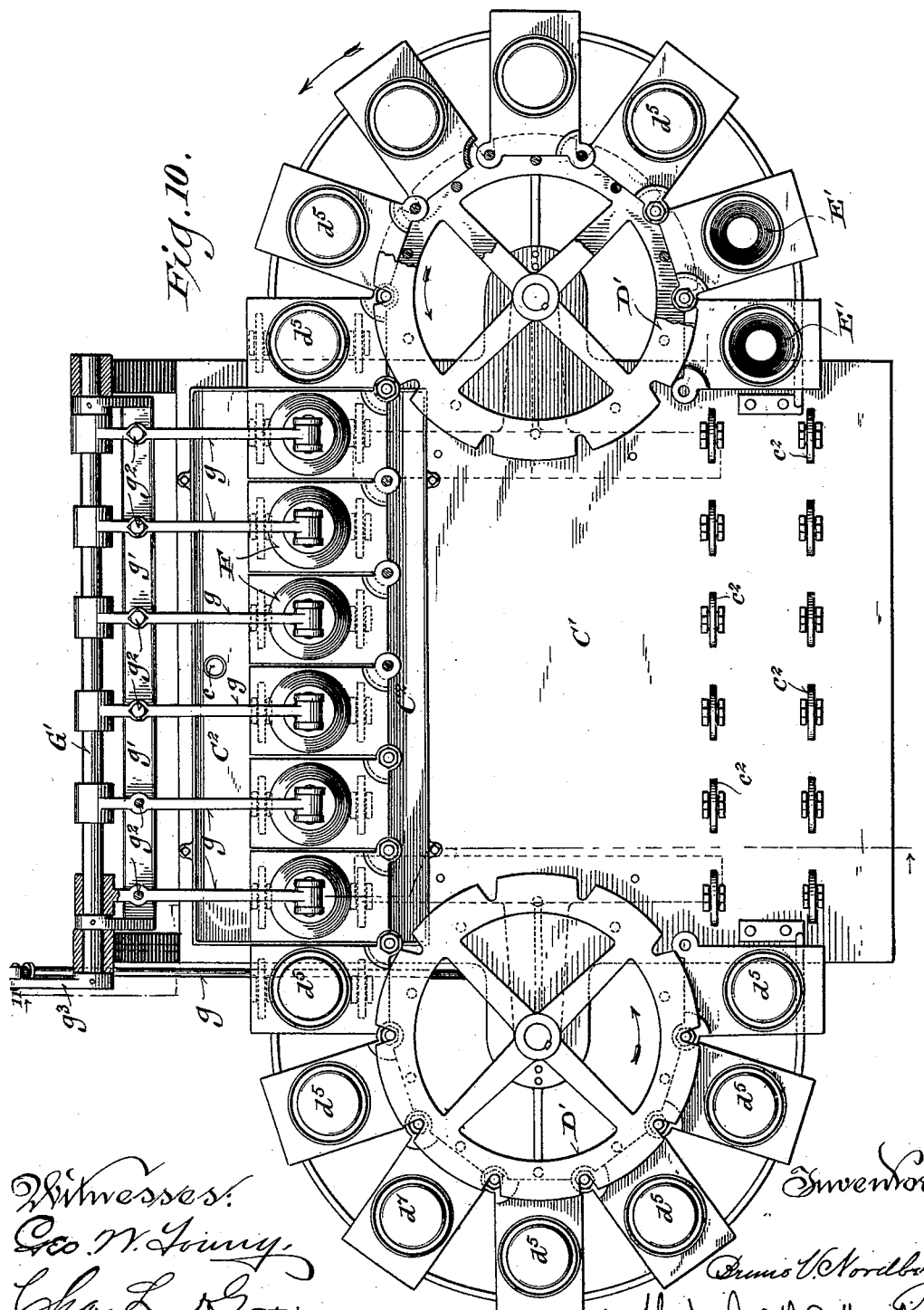

No. 646,604. Patented Apr. 3, 1900.
B. V. NORDBERG.
BOTTLE WASHER.
(Application filed May 15, 1893.)
(No Model.) 8 Sheets—Sheet 7.

Witnesses:
Geo. W. Young.
Chas. L. Goss.

Inventor:
Bruno V. Nordberg,
By Winkler Flanders Smith Bottum Vilas
Attorneys.

No. 646,604. Patented Apr. 3, 1900.
B. V. NORDBERG.
BOTTLE WASHER.
(Application filed May 15, 1893.)
(No Model.) 8 Sheets—Sheet 8.
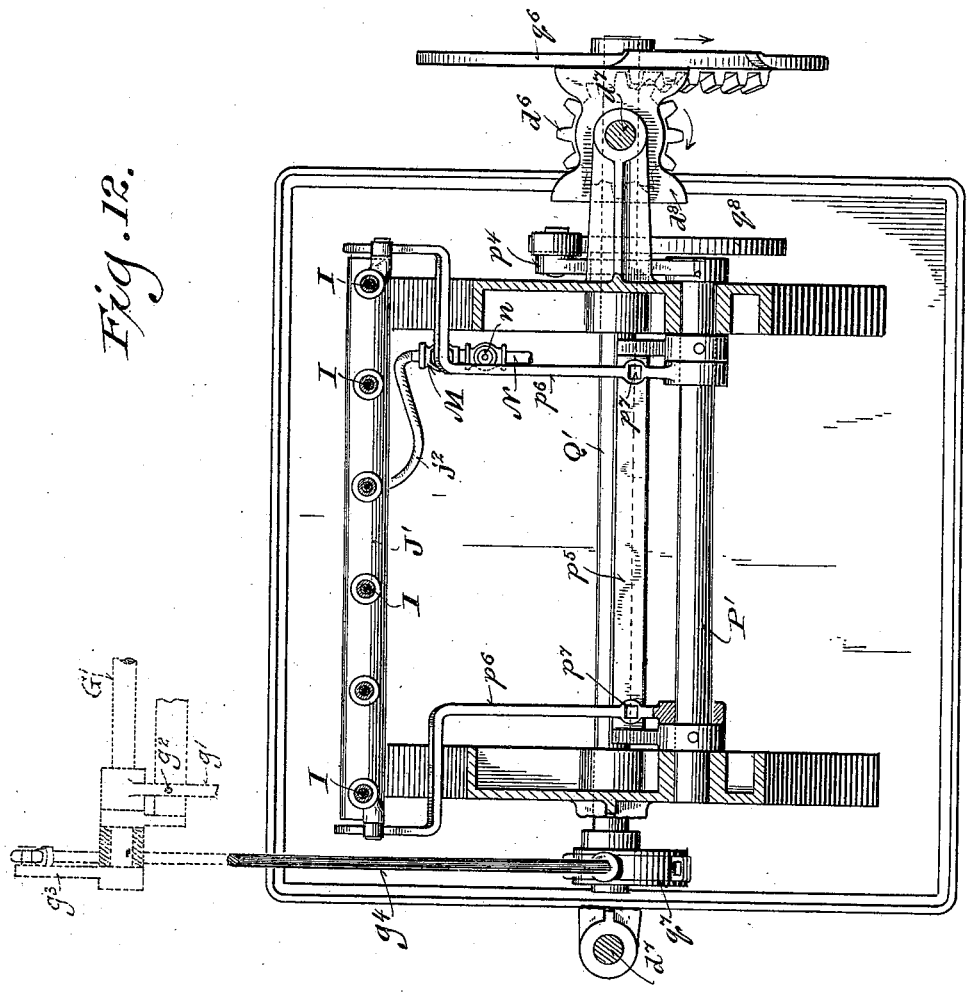
Witnesses:
Geo. W. Lowry.
Chas. L. Goss.
Inventor:
Bruno V. Nordberg,
By Winkler, Flanders, Smith, Bottum & Vilas
Attorneys.
THE NORRIS PETERS CO., PHOTO-LITHO., WASHINGTON, D. C.

UNITED STATES PATENT OFFICE.

BRUNO V. NORDBERG, OF MILWAUKEE, WISCONSIN, ASSIGNOR OF ONE-HALF TO HERMAN G. ANDRAE, OF NEW LONDON, WISCONSIN.

BOTTLE-WASHER.

SPECIFICATION forming part of Letters Patent No. 646,604, dated April 3, 1900.

Application filed May 15, 1893. Serial No. 474,279. (No model.)

*To all whom it may concern:*

Be it known that I, BRUNO V. NORDBERG, of Milwaukee, in the county of Milwaukee and State of Wisconsin, have invented certain new and useful Improvements in Bottle-Washing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to facilitate washing bottles or similar vessels having contracted mouths and in the attainment of that end to provide for variation in the size and shape of bottles and to prevent breaking or injuring the machine or breaking bottles in case bottles of a size or shape for which the machine was not adapted or adjusted should be accidentally placed therein.

It consists in certain novel features in the construction and arrangement of the component parts of the machine hereinafter particularly described, and pointed out in the claims.

In the accompanying drawings like letters designate the same parts in the several figures.

Figure 1:
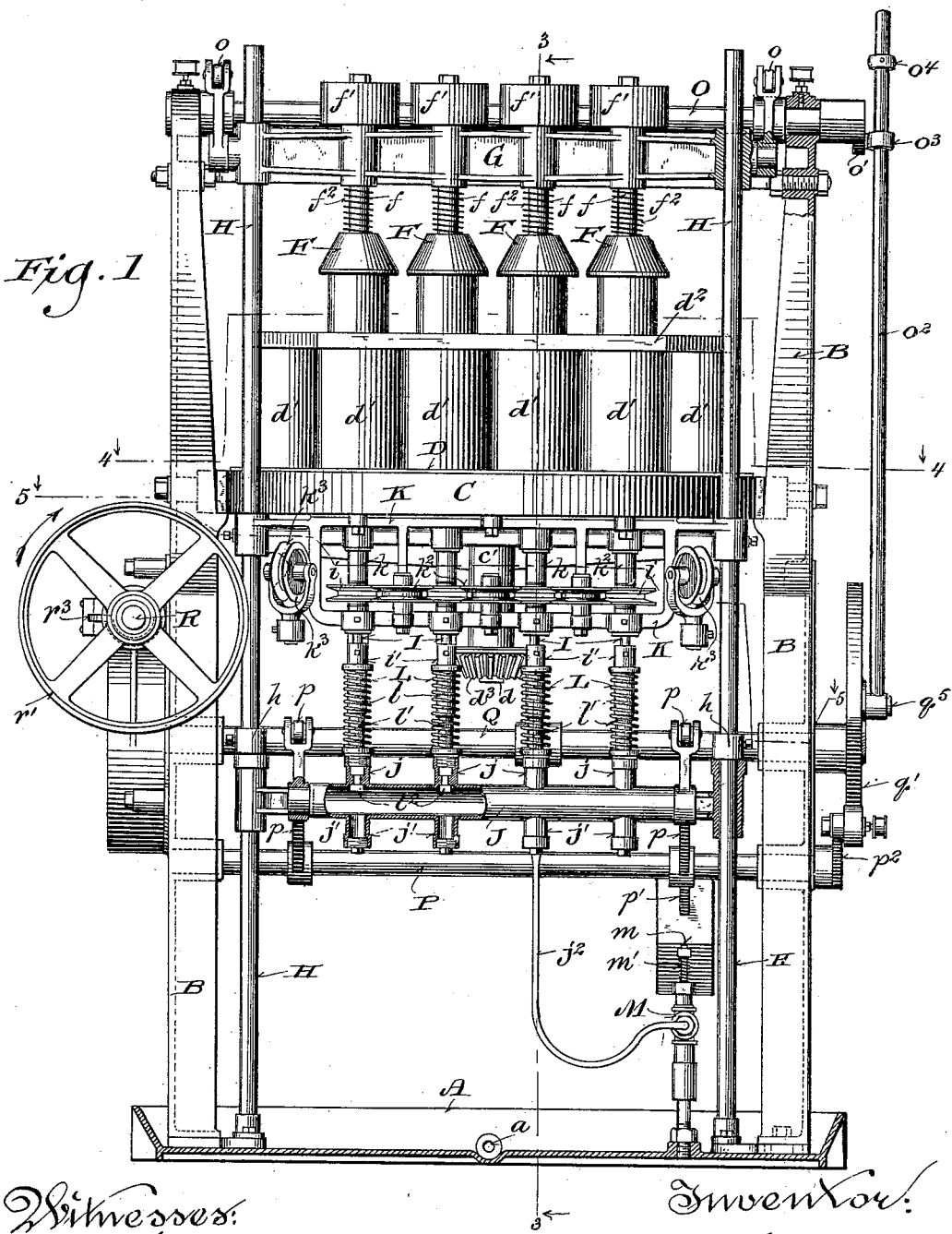
Figure 2:
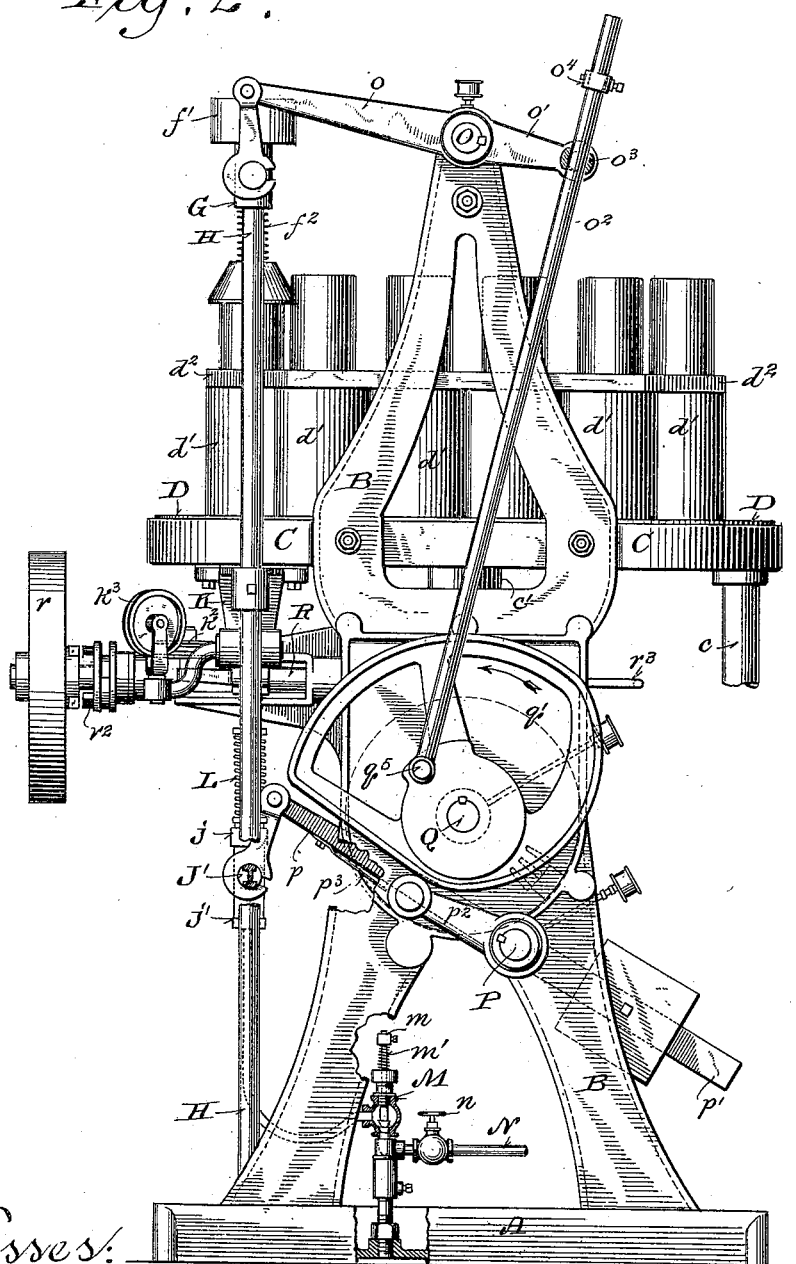
Figure 3:
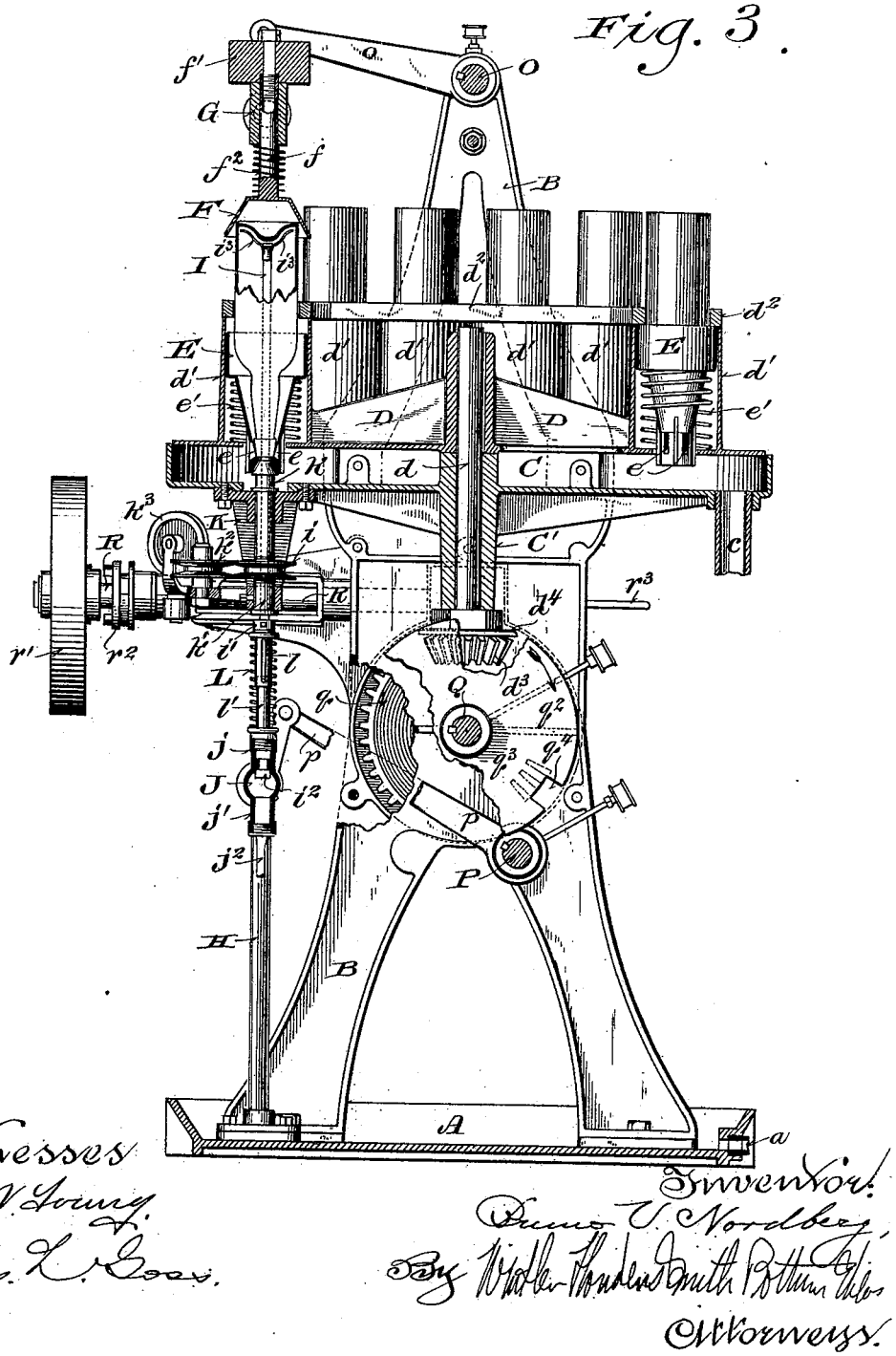
Figure 11:
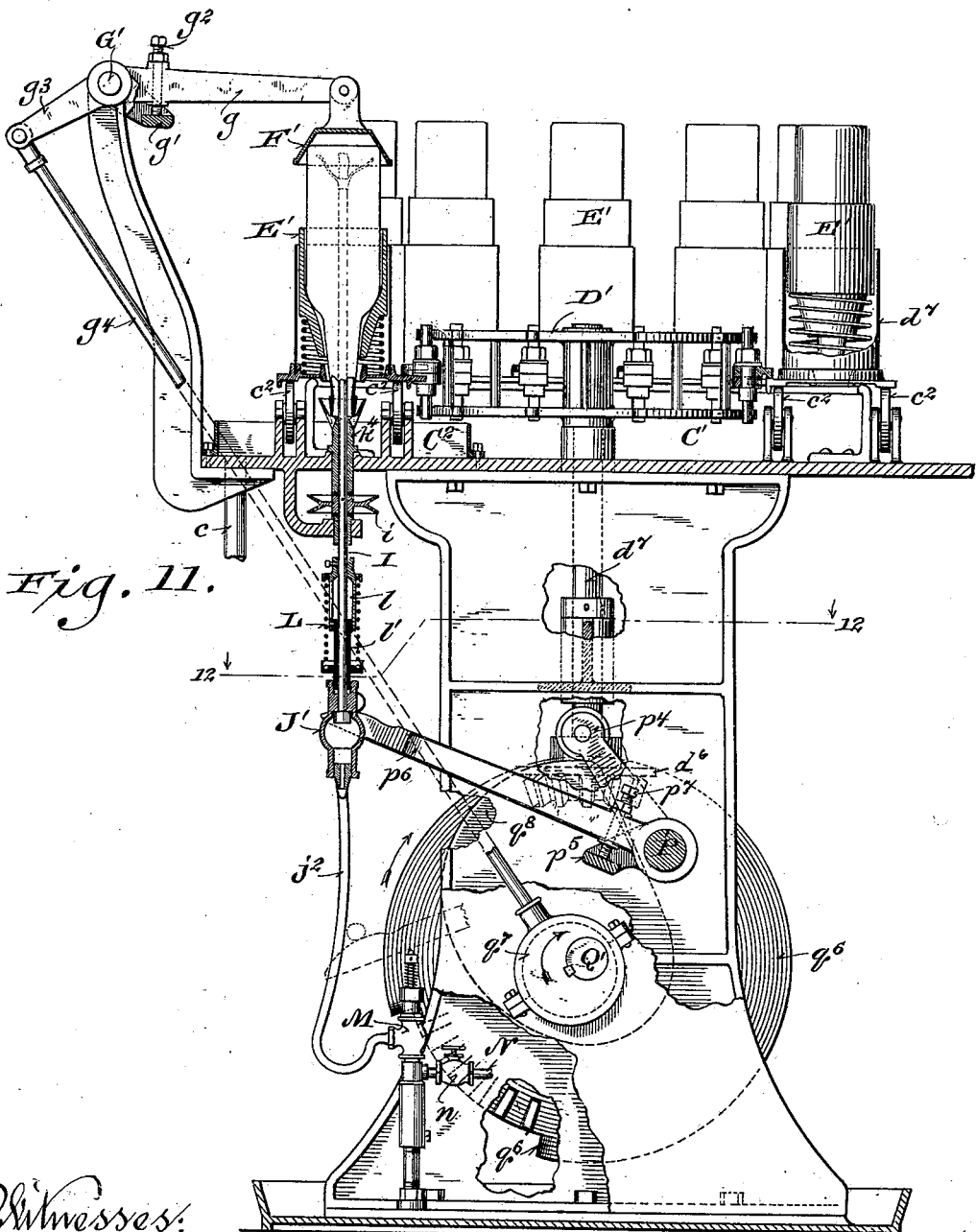

Figure 1 is a front elevation of a machine embodying my invention. Fig. 2 is a side elevation of the machine as viewed from the right with reference to Fig. 1. Fig. 3 is a vertical section taken partially in a plane indicated by the line 3 3, Fig. 1. Fig. 4 is a horizontal section taken in a plane indicated by the line 4 4, Fig. 1, and showing the bottle-carrier and draining-tray in plan view. Fig. 5 is a horizontal section on the line 5 5, Fig. 1. Fig. 6 is a vertical section, on an enlarged scale on the line 3 3, Fig. 1, of one of the brush-spindles and bottle-holders and their connections. Fig. 7 is a horizontal cross-section on the line 7 7, Fig. 6. Fig. 8 is plan view of the gearing by which the bottle-carrier is intermittingly rotated and held in place during the intervals between its intermittent movements. Fig. 9 is a section of the same on the line 9 9, Fig. 8. Fig. 10 is a plan view of a modified form of the machine. Fig. 11 is a vertical section thereof on the line 11 11, Fig. 10; and Fig. 12 is a horizontal section on the line 12 12, Fig. 11.

In describing my machine I shall refer to that side on which the washing devices are located as the "front" and the opposite side, where the operator stands, as the "back."

Referring to Figs. 1 to 3, inclusive, the main frame of the machine, which may be conveniently constructed as therein shown, comprises the base A, formed in the shape of a shallow basin or tray and provided at any convenient point with a drain connection or opening $a$, two side standards B B, and a tray C, attached at opposite sides to and supported in a horizontal position by said standards and provided with a drain pipe or connection $c$.

D is a rotary bottle-carrier supported horizontally over said tray by a vertical shaft $d$, which is held and turns in a central sleeve $c'$ in said tray. It is formed or provided on the upper side with a series of bottle-receptacles $d'$ $d'$, open at their upper ends and having contracted central openings in their lower ends, as shown in Figs. 3, 4, and 6. To the upper ends of these receptacles is secured a cover $d^2$, made of wood or any suitable material which will not break or injure the bottles, and formed directly over and concentric with said receptacles with openings corresponding approximately in size with the bodies of the bottles to be inserted and held therein. In the receptacles $d'$ $d'$ are loosely fitted the upper larger portions of vertically-movable tapering bottle-holders E, the lower smaller ends of which project through and are guided in the contracted openings in the lower ends of said receptacles and are formed with lateral drain-openings $e$ $e$, as shown in Fig. 6. Spiral springs $e'$ $e'$, interposed between the lower ends of said receptacles and shoulders on said holders, tend to move the latter upwardly and hold them against the perforated cover $d^2$, which serves as a stop to limit their upward movement. The bottle-receptacles are preferably arranged in the form of a square, as shown, or of a regular polygon, there being in this case four receptacles on each of the four sides of the carrier.

On the front side of the machine I provide a corresponding number of vertically-movable conical centering-chucks F F, directly under which the bottles contained in the receptacles on each side of the carrier are arranged to be brought and stopped in turn by the intermittent movement of said carrier. These centering-chucks are formed or provided with stems $f\ f$, which pass loosely through vertical sleeves in a vertically-movable cross-head G and are provided above said cross-head with counterweights $f'\ f'$. The cross-head G is supported and guided at the ends upon vertical rods H H, upon which it is freely movable. Between the chucks F F and the cross-head G, I prefer to place around the stems $f\ f$ light spiral springs $f^2$, which sustain the weight of said cross-head, taking it off from its connections with the rod $o^2$ and transferring it upon said chucks when they are lowered upon bottles in the carrier.

The tapering holders E E and the chucks F F afford efficient means for centering and holding bottles, of varying size and shape, in the proper positions for the operation of the washing devices hereinafter described.

It will be observed by reference to Figs. 3 and 6 that the bottles are held by their bottoms and mouths, which vary less in shape and size than the necks or shoulders by which they are held in other machines.

In the same axial lines with the centering-chucks F F, I provide a like number of longitudinally-movable rotary tubes I I, which constitute the brush-spindles and are yieldingly connected with a vertically-movable hollow cross-head J, supported and guided at the ends upon the rods H H. These tubular spindles pass at their upper ends loosely through sleeves $k$ and $k'$, held in a yoke K, which is attached to the under side of tray C, and upon them, between said sleeves, are loosely mounted grooved pulleys $i\ i$, through which they are freely movable endwise, but in which they are held from turning by a key or any suitable device commonly employed for the purpose, and therefore not necessarily shown. At their lower ends the tubular spindles pass loosely through telescoping flanged sleeves $l$ and $l'$, between the flanges on which are interposed spiral springs L L, as shown in detail on an enlarged scale in Fig. 6. The sleeves $l$ abut at their upper ends against collars $i'$, adjustably secured on the spindles I, and the sleeves $l'$ are secured at their lower ends in upwardly-projecting branches $j$ of cross-head J, which constitute stuffing-boxes through which the lower ends of said tubular spindles pass, being retained therein with their open ends in communication with the interior of said cross-head by nuts or collars $i^2$. To the upper ends of said spindles are secured in any suitable manner brushes or flexible wipers $i^3$, which are constructed and arranged to be expanded or spread laterally by the rotation of said spindles. The telescoping sleeves $l$ and $l'$ and the interposed springs L constitute yielding connections between the brush-spindles I and the cross-head J, whereby the upward movement of either brush or spindle should it meet with an obstruction may be arrested without preventing the further advance movement of the cross-head J and the other spindles carried by it and whereby the brushes are permitted to adapt themselves automatically to variations in the lengths and bottoms of the bottles. The cross-head J is formed opposite and in line with the stuffing-boxes $j\ j$ with branches $j'\ j'$, provided with screw plugs or caps, which afford means of access to the lower ends of the tubular spindles I for the purpose of removing obstructions therefrom or of removing the spindles themselves. One of the branches $j'$ is connected through a perforated plug, as shown in Figs. 1 and 3, by a flexible tube $j^2$ with a valve M, controlling the admission of water thereto from a supply-pipe N, which is provided with a cock $n$, as shown in Fig. 2, for permanently shutting off the water. The upper ends of the sleeves $k\ k$, projecting above the bottom of tray C, are made conical to fit corresponding recesses in the lower ends of the holders E, as shown in Figs. 3 and 6, whereby said holders and the bottles contained therein are exactly centered with the brush-spindles when the lower ends of said holders are forced down upon the upper conical ends of said sleeves, as hereinafter explained. The upward movement of the cross-head J may be limited independently of its actuating connections by collars $h\ h$, adjustably secured upon the rods H H.

O is a horizontal rock-shaft supported by bearings in the upper ends of the standards B B parallel with the cross-head G and provided with parallel arms $o\ o$, which are linked to the ends of said cross-head, and with the arm $o'$, through which it is actuated by the connections hereinafter specified. P is a similar horizontal rock-shaft supported by bearings in the lower part of the frame parallel with the cross-head J and provided with parallel arms $p\ p$, which are linked to said cross-head at or near its ends. It is also provided with an adjustably-weighted arm $p'$, which tends to raise said cross-head, and at one end with a crank-arm $p^2$, carrying a friction-roller at its free end.

Q is a rotary shaft supported by suitable bearings in the frame parallel with the rock-shaft P and between it and the tray C. It is provided at one end with a worm-gear $q$ and at the opposite end with a cam $q'$, the periphery of which bears against the friction-roller at the end of arm $p^2$, and at an intermediate point with a disk $q^2$, formed or provided with a segment $q^3$ of a bevel-gear arranged to engage intermittingly with a bevel-pinion $d^3$ on the lower end of the bottle-carrier shaft $d$, as shown in Figs. 3, 5, 8, and 9. Fixed to the upper side of the pinion $d^3$ is a polygonal (in this case a square) plate $d^4$, the straight edges of which normally abut against or lie close to the adjacent face of the disk $q^2$, as shown in Fig. 5, thereby holding the pinion $d^3$ immovable after each quarter-turn imparted thereto by the segment-gear $q^3$. An opening $q^4$ is formed in the disk $q^2$ adjacent to the segment-gear to permit of the passage of the corners of plate $d^4$, as shown in Figs. 8 and 9, when said segment-gear engages with the pinion $d^3$ and turns it a quarter of a revolution. The arm $o'$ of rock-shaft O is connected by a rod $o^2$, passing loosely through a collar swiveled in the free end of said arm, with a crank-pin $q^5$ on the cam $q'$. The rod $o^2$ is provided above the arm $o'$ with an adjustable collar $o^4$, by means of which the vertical movement of the cross-head G may be adjusted to accommodate bottles of different sizes or lengths.

R is a horizontal driving-shaft supported in bearings at one end of the machine transversely to the shaft Q and provided with a worm $r$, engaging the worm-gear $q$, and with a pulley $r'$, loosely mounted thereon and arranged to be connected and disconnected therewith by a clutch $r^2$, which is operated by a forked sliding rod $r^3$. The valve M, hereinbefore referred to, is placed with its stem $m$ directed upwardly into the path of one of the arms $p$, by the descent of which it is arranged to be closed, and it is provided with a spring $m'$, by which it is opened. It has a vertically-adjustable connection with the base A, whereby it may be accurately set to be properly operated by said arm $p$, which is provided with a spring $p^3$ to produce an elastic or yielding contact with the valve-stem.

Referring to Figs. 1, 2, 3, and 5, $k^2 k^2$ are grooved idlers mounted on vertical pins carried by the yoke K in lines parallel and alternating with the brush-spindles. Adjustably connected with and carried in vertical planes by the ends of said yoke are two similar idlers $k^3 k^3$, under which a rope or round belt passes to and from a driving-pulley located above (not shown) and to and from the pulleys $i$ $i$ of the two outer brush-spindles, thence alternately around the intermediate idlers $k^2 k^2$ and pulleys $i$ $i$. The idlers $k^3 k^3$ may be adjusted to run in different planes by means of their universal-joint connections with the yoke K in order to properly direct the driving rope or belt to and from the driving-pulley and the outer pulleys $i$ $i$.

My improved machine, constructed as hereinbefore described, operates as follows: Bottles are placed with their mouths downward in the receptacles $d'$ $d'$ of the carrier as they pass the operator on the front side of the machine and are carried by the intermittent rotation of said carrier between the vertically-movable chucks F F and the rotary brush-spindles I I. In this position the movement of the carrier is temporarily arrested, and it is held immovably in place by one of the edges of the polygonal plate $d^4$, presented to the adjacent face of the disk $q^2$. The collar $o^4$ on the rod $o^2$ being carried upwardly by the rotation of the crank-pin $q^5$ out of contact with the collar $o^3$ allows the cross-head G to descend by its own weight and that of the counterweights $f'$ $f'$. The chucks F F are thus caused to descend upon the bottoms of the bottles underneath them, as shown in Figs. 1 and 3. The funnel-shaped holders E E are in turn moved downwardly by the bottles against the force of the springs $e'$ $e'$ upon the upper conical ends of the sleeves $k$ $k$, by which the bottles are exactly centered with the tubular brush-spindles, which are then projected upwardly through said sleeves by the operation of the counterweight on the arm $p'$, the cam $q'$ having been turned into a position to permit of the upward movement of the arm $p^2$, as shown in the drawings. The cam $q'$ is so constructed and set as to allow the brush-spindles to remain in their upper positions a sufficient time to thoroughly cleanse the bottoms of the bottles. The yielding connections afforded by the telescoping sleeves $l$ $l'$ and springs L permit the brushes to advance more or less, according to the varying depths of the bottles in which they are simultaneously inserted. As the brushes enter the bottles the valve M is released and permitted to open, admitting water through the cross-head J to the several tubular spindles I I, through which it is injected into the bottles. At the same time they are thoroughly rubbed and cleansed inside by the brushes or flexible wipers $i^3$ $i^3$, which are thrown outwardly against the inner surfaces of the bottles by the rapid rotation of the brush-spindles. The cam $q'$ in its continued rotation depresses the arm $p^2$ and through the connections hereinbefore described moves the cross-head J downwardly, thereby withdrawing the brushes from the bottles. At the same time the water is shut off from the tubular spindles by the descent of the adjacent arm $p$ upon the valve-stem $m$ of valve M. Upon the withdrawal of the brushes from the bottles the crank-pin $q^5$, acting through the rod $o^2$ and the connections hereinbefore described, raises the cross-head G, and with it the chucks F F, thereby permitting the bottle-holders E E to be lifted, with the bottles therein contained, by the springs $e'$ $e'$ out of engagement with and clear of the upper conical ends of the sleeves $k$ $k$. The segment-gear $q^3$ now engages with the pinion $d^3$ and turns the bottle-carrier C a quarter of a revolution, bringing another row of bottles into line with the chucks F F and the brush-spindles I I. The operation is repeated as above described, the cleansed bottles being removed by the operator from the machine and their places supplied with unwashed bottles as the receptacles $d'$ $d'$ are brought by the movement of the carrier within his reach on the front side of the machine. The water discharged and drained from the bottles during the foregoing operation is caught in the tray C and carried off through its drain pipe or connection $c$, and any leakage or drip from the water connections below said tray is caught by the basin-shaped base A and conducted off through its drain pipe or connection $a$.

The machine may be adjusted to operate upon bottles of different sizes by simply changing the positions of the collars $h\ h$ and $o^4$, whereby the vertical movements of the cross-heads G and J in an upward direction may be arrested at the desired points. In case a bottle of a larger size than that for which the machine is adapted or adjusted should be accidentally inserted therein either of the chucks F under which it might be brought would yield sufficiently to accommodate it without injury thereto or to the machine and without necessarily interfering with the operation of the machine upon the remaining bottles in the same row. It will be observed that besides the independent yielding movement allowed each of the chucks F they are all permitted to recede upwardly beyond the limit of the independent yielding movement of each by reason of the loose connection between the arm $o'$ and the rod $o^2$. In case a bottle having its mouth obstructed or too small to admit the brush opposite which it is stopped is placed in the machine the upward movement of the cross-head J would be thereby arrested without causing any injury either to the bottles or to the machine, the advance movement of the brush-spindles, as well as that of the chucks F F, being effected by yielding connections, while, on the other hand, their retiring movements are positively effected. In this way the advance of either the brush-spindles or of the chucks will be arrested in case an obstruction is encountered which might otherwise injure or break the machine or bottles, and the complete and positive withdrawal of said spindles and chucks prior to each advance movement of the bottle-carrier is insured.

Referring to Figs. 10 to 12, inclusive, illustrating a modification of the machine designed mainly to increase its capacity, the bottle-carrier is constructed of a series of articulated receptacles $d^5\ d^5$, which are carried in the manner of a chain belt upon suitably-constructed sprocket-wheels or drums D' D'. Between the sprocket-wheels or drums the sides of the carrier are supported and guided in their proper positions by friction-rollers $c^2\ c^2$, mounted upon the table C', which is provided on the front side of the machine, where the bottles are washed, with a tray $C^2$ for catching and conducting off the water discharged from the bottles. The vertically-yielding tapering bottle-holders E' E', with which said receptacles are provided, are in this case constructed and arranged to support the bottles by their shoulders instead of by their mouths, and they do not extend through and below the bottoms of said receptacles. An intermittent movement is imparted to the carrier, and it is held immovable during the intervals between such intermittent movements by a disk $q^6$, mounted on a rotary horizontal shaft Q' and formed or provided with a segment-gear arranged to engage at each revolution of said shaft with a bevel-pinion $d^6$ on the vertical shaft $d^7$ of one of said sprocket-wheels or drums and by a plate $d^8$, fixed upon said shaft $d^7$ and having two straight edges, one of which when the carrier is at rest abuts against or stands close to and parallel with the adjacent face of the disk $q^6$, as seen in Fig. 12. By this mechanism the sprocket-wheels or drums are turned a half-revolution and the carrier is advanced a distance equal to six bottle-receptacles each time. The conical chucks F' F', by which the bottoms of the bottles are centered and held in place for the operation of the washing devices, are pivoted to the free ends of vertically-movable horizontal arms $g\ g$, loosely mounted at their opposite ends upon a rock-shaft G', supported in a horizontal position by brackets attached to the front side of the table C'. Rigidly connected with said shaft by parallel arms is a bar $g'$, passing parallel therewith underneath the arms $g\ g$, which are provided with adjusting-screws $g^2\ g^2$, adapted to bear upon the upper side of said bar $g'$. The rock-shaft G' is provided with an arm $g^3$, which is connected by a rod $g^4$ with an eccentric $q^7$ on the shaft Q'. The sleeves $k^4\ k^4$, through which the upper ends of the brush-spindles I I pass, are formed above the table C' with conical cups, which are adapted to receive the mouths of the bottles when they are depressed by the chucks F' and center them with and hold them in the proper position to receive the brushes when they are projected upwardly into operative position. These conical cups are formed at the bottom with lateral drain-openings through which the water injected into the bottles is allowed to flow out into the tray $C^2$. The brush-spindles have yielding connections with the vertically-movable hollow cross-head J' like or similar to those of the machine first described. P' is a rock-shaft parallel with the shaft Q', provided with an arm $p^4$, carrying a friction-roller at its free end, which bears on the periphery of a cam $q^8$ on said shaft Q' and with arms $p^6\ p^6$, loosely mounted thereon and engaging at their free ends with cross-head J', at or near its ends. A bar $p^5$, passing underneath the arms $p^6\ p^6$, is rigidly connected with the rock-shaft P', parallel therewith, and the arms $p^6\ p^6$ are provided with adjusting-screws $p^7\ p^7$, which rest normally upon the upper side of said bar $p^5$. The eccentric $q^7$ and the cam $q^8$ are so formed and set upon the shaft Q' as to raise the chucks F' F' and the cross-head J', with the brush-spindles I I, at the proper times through the connections just described. The reverse or downward movements of said chucks, cross-head, and brush-spindles are effected by their own weight, or, if necessary, by additional weights or springs. The valve M, by which the flow of water to the cross-head J' from the supply-pipe N is controlled, is automatically closed at the proper time by the descent of one of the arms $p^6$ and is opened when said arm is raised by a spring, as in the machine first described. The operation of this modified form of the machine is like or similar to that of the form first described and will be readily understood without further explanation. The machine may be readily adapted for operation upon bottles of different sizes by adjusting the screws $g^2 g^2$ and $p^7 p^7$ to produce the requisite axial movements of the chucks F′ F′ and brush-spindles I I, and by changing the bottle-holders E′ E′, which must in this case correspond in size with the bottles to be operated upon, which are held by their necks or shoulders instead of by their mouths, as in the machine first described.

When the mouths of the bottles are properly centered in line with the brush-spindles, it is not essential that the bottoms should also be accurately centered therewith; hence the chucks need not be made conical or tapering, but so as to simply move and hold the mouths of the bottles in engagement with the opposing centering and holding devices, and by the term "chuck" as herein employed I intend to designate a device for simply holding or supporting the bottoms of bottles, as well as one which is constructed to perform the additional function of centering them.

Various changes in the details of construction and arrangement of the component parts of the machine may be made within the spirit of my invention.

I claim—

1. In a bottle-washing machine, the combination of an intermittently-moving carrier provided with a series of longitudinally-yielding bottle-holders, and a chuck movable axially toward and from said holders as they are brought into line with it and adapted to engage the bottoms of bottles therein, substantially as and for the purposes set forth.

2. In a bottle-washing machine, the combination of a carrier provided with a series of longitudinally-yielding tapering bottle-holders, a series of tapering chucks movable axially toward and from said holders as they are brought by the movement of the carrier into line with them, and a series of longitudinally-movable rotary brushes, substantially as and for the purposes set forth.

3. In a bottle-washing machine, the combination of an intermittingly-moving carrier having a series of bottle-receptacles, a number of longitudinally-movable brushes, a like number of chucks arranged in the axial lines of said brushes on the opposite side of the carrier and movable toward and from the same and conical or tapering centering devices through which said brushes are projected and by which the mouths of the bottles are centered therewith, substantially as and for the purposes set forth.

4. In a bottle-washing machine the combination of a carrier provided on the upper side with a series of vertically-movable bottle-holders, means for imparting an intermittent horizontal movement to said carrier, a number of vertically-movable rotary brushes arranged below said carrier in position to enter bottles in said holders when they are brought by the carrier into line with said brushes, tapering centering devices in which said brushes are guided, adapted by engagement with said bottle-holders to bring them exactly into line with said brushes, and means for depressing said holders into engagement with said centering devices when they are brought opposite each other, substantially as and for the purposes set forth.

5. In a bottle-washing machine, the combination of a horizontally-movable carrier provided on the upper side with vertically-yielding bottle-holders, a number of vertically-movable brushes below the carrier, a vertically-movable cross-head above the carrier provided with means for engaging the bottoms of bottles in said holders, and means for yieldingly depressing said cross-head when said bottle-holders are brought by the carrier opposite said brushes, substantially as and for the purposes set forth.

6. In a bottle-washing machine, the combination of a rotary carrier having a series of receptacles provided with longitudinally-yielding tapering bottle-holders movable transversely to the movement of the carrier, means for imparting an intermitting movement to said carrier, a number of longitudinally-movable rotary brushes arranged on one side of the carrier at intervals corresponding with the spaces between said receptacles, a like number of chucks or followers arranged on the opposite side of the carrier and movable in the same axial lines with said brushes transversely to the movement of the carrier, and a like number of conical or tapering centering devices through which the brushes are projected, adapted to engage with the correspondingly-formed adjacent ends of said holders and to center the same and the bottles contained therein with said brushes, substantially as and for the purposes set forth.

7. In a bottle-washing machine, the combination of a horizontal rotary carrier having a series of vertical receptacles provided with vertically-movable tapering bottle-holders, springs interposed between said carrier and said holders and tending to move the latter upwardly, means for imparting an intermitting movement to said carrier, a number of vertically-movable rotary brushes arranged underneath the carrier at intervals corresponding with the spaces between the receptacles therein, and a like number of vertically-movable chucks or followers arranged above the carrier in line with said brushes, substantially as and for the purposes set forth.

8. In a bottle-washing machine, the combination with a horizontally-movable carrier having a series of vertically-yielding bottle-holders, a number of vertically-movable brushes arranged below the carrier, and a vertically-movable cross-head above the carrier provided with a number of chucks or followers, having yielding connections therewith and arranged and movable in the same axial lines with said brushes, substantially as and for the purposes set forth.

9. In a bottle-washing machine, the combination of a horizontally-movable carrier provided with vertically-yielding bottle-holders, a number of vertically-movable brushes below the carrier, a vertically-movable cross-head above the carrier provided with a number of chucks or followers having yielding connections therewith and arranged and movable in the same axial lines with said brushes, and mechanism connected with and arranged to positively raise and yieldingly lower said cross-head at the proper times, substantially as and for the purposes set forth.

10. In a bottle-washing machine, the combination of a horizontally-movable carrier provided with a series of vertically-yielding bottle-holders, a number of vertically-movable rotary brushes below said carrier, a vertically-movable cross-head above said carrier, means for raising and lowering said cross-head at the proper times, a number of chucks or followers arranged in the same axial lines with said brushes and provided with weighted stems which are loosely held in said cross-head, substantially as and for the purposes set forth.

11. In a bottle-washing machine, the combination of a horizontally-movable carrier provided with a series of vertically-yielding bottle-holders, a number of vertically-movable rotary brushes below said carrier, a vertically-movable cross-head above said carrier, means for raising and lowering said cross-head at the proper times, a number of chucks or followers arranged in the same axial lines with said brushes and provided with stems which are loosely held and movable vertically in said cross-head, and springs interposed between said chucks and cross-head, substantially as and for the purposes set forth.

12. In a bottle-washing machine, the combination of a horizontally-movable carrier provided with a series of vertically-yielding bottle-holders, a number of vertically-movable rotary brushes below said carrier, a vertically-movable cross-head above said carrier provided with a number of chucks or followers in the same axial lines with said brushes, a rock-shaft parallel with said cross-head and provided with arms which are linked thereto, a driving-shaft provided with a crank or eccentric, and a rod having a sliding connection with an arm on said rock-shaft, above which it is provided with an adjustable stop and connecting the same with said crank or eccentric, substantially as and for the purposes set forth.

13. In a bottle-washing machine, the combination of an intermittingly-moving carrier provided with a series of longitudinally-yielding bottle-holders movable transversely to the movement of the carrier, a number of chucks or followers arranged on one side of the carrier and movable transversely thereto, and a like number of tubular brush-spindles arranged on the opposite side of the carrier and movable in the same axial lines with said chucks, said spindles having a water-supply connection, substantially as and for the purposes set forth.

14. In a bottle-washing machine, the combination of a bottle-carrier, a hollow cross-head movable transversely thereto, having a flexible water-supply connection, and a number of tubular rotary brush-spindles having longitudinally-yielding connections with said cross-head, substantially as and for the purposes set forth.

15. In a bottle-washing machine, the combination of an intermittingly-moving bottle-carrier provided with yielding bottle-holders, a tubular rotary brush-spindle movable transversely to said carrier into and out of the bottles held therein and having a water-supply connection, a valve in said connection, mechanism arranged to automatically open said valve when the brush-spindle is inserted in a bottle and to close it when it is withdrawn therefrom, a stationary guiding-sleeve through which the brush-spindle is projected into a bottle, having a tapering end adapted to engage with corresponding recesses in said holders and to center the mouths of bottles contained therein with said brush-spindle, and means of pressing said holders into engagement with said sleeve when they are brought opposite thereto, substantially as and for the purposes set forth.

16. In a bottle-washing machine, the combination of a bottle-carrier, a hollow cross-head movable transversely thereto and having a flexible water-supply connection, a number of tubular rotary brush-spindles having yielding connections with said cross-head, a rock-shaft provided with arms which are linked to said cross-head, a cam working with an arm on said rock-shaft and arranged to positively withdraw the brush-spindles from bottles held in said carrier at the proper time, and a weight connected with said rock-shaft and acting thereon in opposition to said cam, substantially as and for the purposes set forth.

17. In a bottle-washing machine, the combination of an intermittingly-moving bottle-carrier, a hollow cross-head movable transversely thereto and having a flexible water-supply connection, a series of tubular rotary brush-spindles connected with said cross-head, and mechanism connected with and arranged to yieldingly advance said cross-head and to positively withdraw it, substantially as and for the purposes set forth.

18. In a bottle-washing machine, the combination of an intermittingly-moving bottle-carrier, a hollow cross-head movable transversely thereto and having a flexible water-supply connection, a series of tubular rotary brush-spindles connected with said cross-head, mechanism connected with and arranged to yieldingly advance said cross-head and to positively withdraw it, and an adjustable stop arranged to limit the advance movement of said cross-head at the desired point, substantially as and for the purposes set forth.

19. In a bottle-washing machine, the combination with a bottle-carrier of a driving-shaft provided with a disk and segment-gear, and a driven shaft provided with a gear or pinion arranged to be engaged by the segment-gear at each revolution of the driving-shaft and with a polygonal plate, one edge of which lies close to the adjacent face of said disk and prevents the rotation of the driven shaft when the gears are not in engagement, substantially as and for the purposes set forth.

20. In a bottle-washing machine, the combination with a bottle-carrier of a driving-shaft provided with a disk and segment bevel-gear, a bevel gear or pinion mounted on the carrier-shaft in position to be engaged by the segment-gear at each revolution of the driving-shaft, and a polygonal plate also mounted on the carrier-shaft in position to present one of its edges to the adjacent face of said disk when said gears are not in engagement, said disk being formed with an opening through which the corners of said plate are allowed to pass when the carrier is turned, substantially as and for the purposes set forth.

21. In a bottle-washing machine, the combination of a horizontally-movable bottle-carrier, a catch basin or tray located below it and provided with an overflow-opening or drain connection and with guiding-sleeves projecting upwardly through it, and rotary tubular brush-spindles having a water-supply connection and arranged to be projected upwardly through the guiding-sleeves in said tray into the bottles held in said carrier, substantially as and for the purposes set forth.

22. In a bottle-washing machine, the combination of a horizontally-movable carrier provided with a series of vertically-yielding tapering bottle-holders having lateral drain-openings in their lower ends, a catch basin or tray located below said carrier, a number of sleeves projecting upwardly through the bottom of said tray, having conical upper ends, a number of rotary tubular brush-spindles arranged to be projected upwardly through said sleeves into the bottles held in said carrier, and a like number of vertically-movable chucks or followers arranged above the carrier in line with said brush-spindles and adapted to engage the bottoms of bottles underneath them and depress the lower ends of the holders in which they are contained upon the upper conical ends of said sleeves to which they are fitted, substantially as and for the purposes set forth.

In testimony that I claim the foregoing as my own I affix my signature in presence of two witnesses.

BRUNO V. NORDBERG.

Witnesses:
CLARA J. JANECK,
CHAS. L. GOSS.